(12) United States Patent
Wang et al.

(10) Patent No.: US 9,690,565 B2
(45) Date of Patent: Jun. 27, 2017

(54) APPLICATION ASSISTED SOFTWARE UPDATE FOR CONNECTED DEVICES WITHOUT A DISPLAY

(71) Applicant: Cellco Partnership, Arlington, VA (US)

(72) Inventors: Huiyu Wang, Bridgewater, NJ (US); Kathleen J. Chylinski, Bridgewater, NJ (US); Stephen J. Kolanowski, Keller, TX (US); Snehal Desai, Old Bridge, NJ (US); Jerome A. Bankos, Jr., Northhampton, PA (US); Frank D. Larocca, Malboro, NJ (US); Lily Zhu, Parsippany, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 172 days.

(21) Appl. No.: 14/135,031

(22) Filed: Dec. 19, 2013

(65) Prior Publication Data

US 2015/0178061 A1     Jun. 25, 2015

(51) Int. Cl.
  *G06F 9/44*   (2006.01)
  *G06F 9/445*  (2006.01)

(52) U.S. Cl.
  CPC . *G06F 8/65* (2013.01); *G06F 8/61* (2013.01)

(58) Field of Classification Search
  CPC .................................. G06F 8/61–8/65
  See application file for complete search history.

(56) References Cited

U.S. PATENT DOCUMENTS

| | | | |
|---|---|---|---|
| 7,176,808 B1* | 2/2007 | Broad | G01D 21/00 340/870.07 |
| 7,480,907 B1* | 1/2009 | Marolia et al. | 717/174 |
| 2007/0027971 A1* | 2/2007 | Marolia et al. | 709/223 |
| 2008/0301671 A1* | 12/2008 | Kim | G06F 8/65 717/173 |
| 2009/0288071 A1* | 11/2009 | Seidman | G06F 8/65 717/126 |
| 2011/0072423 A1* | 3/2011 | Fukata | 717/172 |
| 2012/0159468 A1* | 6/2012 | Joshi et al. | 717/172 |
| 2013/0145356 A1* | 6/2013 | Ranjan | G06F 21/57 717/170 |
| 2014/0115574 A1* | 4/2014 | Valentine et al. | 717/172 |

\* cited by examiner

*Primary Examiner* — Lewis A Bullock, Jr.
*Assistant Examiner* — Tina Huynh

(57) ABSTRACT

An exemplary system and method avoids unannounced software updates for a connected device by acquiring installation consent from the user for each software update to the connected device. Consent is acquired by leveraging an extended interface application described below, to facilitate notifications from the connected device to the user and receive user inputs indicating consent in response to the notifications.

18 Claims, 6 Drawing Sheets

APPLICATION ASSISTED SOFTWARE UPDATE FOR CONNECTED DEVICES WITHOUT A DISPLAY

BACKGROUND

A device without a display is generally any electronic hardware that operates without a constant need for human control of underlying software. For instance, a network router once configured may manage a set of network connections without user manipulation of router software. Similarly, a key remote for a motor vehicle once programmed may be utilized by a user to unlock doors, arm/disarm security systems, etc. without the user configuring key remote software prior to every use.

A device without a display may further be connected to a system. Taking the examples above, the router and the key remote may include communication technology that connects these devices to a system, which updates to the respective underlying software.

However, an unannounced software update, e.g., when a connected device without a display proceeds with the software updates without user notifications and/or confirmations, may interrupt an important usage of the connected device; cause the connected device to be perceived as malfunctioning or broken; cause the connected device to disconnect from the system; and/or cause the connected device to power cycle, each of which would prevent the seamless operation of the connected device.

Thus, there is a need for a system that enables connected devices without a display to receive consent from a user or third party before a software update.

DETAILED DESCRIPTION

A system and method avoids unannounced software updates for a connected device by acquiring installation consent from the user for each software update to the connected device. Consent is acquired by leveraging an extended interface application described below, to facilitate notifications from the connected device to the user and receive user inputs indicating consent in response to the notifications. The extended interface application may be located and directly accessed on a user device, such as a computing device described below. The extended interface application may also be located on a remote device, such as the cloud device described below, which is accessed from the user device via a web portal.

Figure 1A:
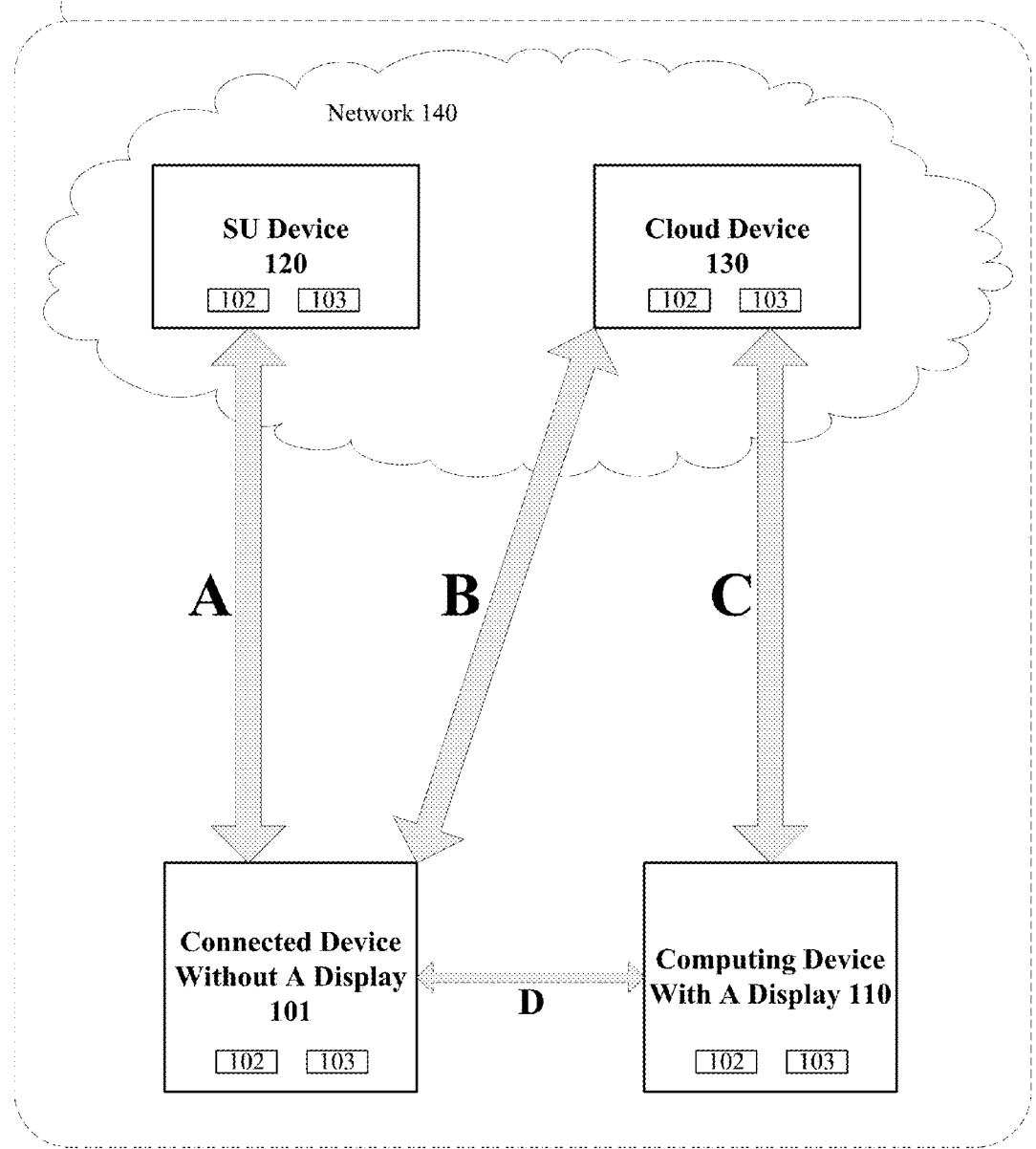
FIGS. 1A-B illustrate an exemplary system in which a connected device without a display and a computing device operate.

FIG. 1A illustrates an exemplary system 100 having a connected device without a display ("connected device") 101 that leverages a computing device 110 to acquire an installation consent. Further, FIG. 1A illustrates a Software Update ("SU") device 120 and a cloud device 130, which may generally be servers as described below, that communicate with the connected and computing devices 101, 110 from a network 140 in support of acquiring an installation consent.

In one exemplary communication operation, the SU device 120 may inform the connected device 101 that a software package is available to download, and in turn the connected device 101 downloads the software package (see Arrow A). The connected device 101 further requires an installation consent from a user or third party before installation of the software package to avoid the unannounced device software update discussed above.

To acquire the installation consent, the connected device 101 may send a software update available indication to the cloud device 130 (see Arrow B), which forwards the software update available indication to the computing device 110 (see Arrow C). The computing device 110 may operate an extended interface application (described below with reference to FIG. 2) to then generate user interfaces to provide a software update available notification to and receive an input that may indicate the installation consent from the user or third party. The connected device 101 may also leverage the extended interface application to acquire the installation consent on the cloud device 130 to communicate notifications and receive inputs via a web portal of the computing device 110. The input received via the extended interface applications and/or web portals may generally indicate user acceptance, deferral, or rejection of the software package.

In response to the input, the computing device 110 may send a response indication based on the input to the cloud device 130 (see Arrow C). The cloud device 130 may forward the response indication to the connected device 101 (see Arrow B). Based on the response indication, e.g., accept, defer, or reject, the connected device 101 performs a particular operation. For, example, when the input was an acceptance of the software package, the response indication triggers an installation of the software package by the connected device 101. In this way, the computing device 110 may be leveraged by the connected device 101 to acquire the installation consent in support of the Software Update (SU) experiences, alerts, and interactions.

In another exemplary communication operation, after the software package is communicated and downloaded by the connected device 101 (see Arrow A); the connected device 101 may directly communicate with the SU device 120 to exchange the software update available indication and the response indications (see Arrow D) rather than communicating indications through the cloud device 130. In general, this direct communication operation (see Arrows A, D) may be utilized when the connected device 101 and computing device 110 are within a radio range that enables direct communication, as further described below. In comparison, the cloud device 130 communication operation above (see Arrows A, B, C) may generally be utilized regardless of a radio range between the connected device 101 and computing device 110.

The exemplary system 100 and devices 101, 110, 120, 130 may be any computing system and/or device that includes a processor and a memory (e.g. 102 and 103, respectively). Computing systems and/or devices generally include computer-executable instructions, where the instructions may be executable by one or more computing devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The exemplary system 100 and items therein (e.g., devices 101, 110, 120, 130) may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., devices 101, 110, 120, 130) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, cell phones, smart-phones, super-phones, tablet computers, next generation portable devices, mobile printers, handheld computers, secure voice communication equipment, or some other computing system and/or device. Alternatively, computing systems and/or devices may also be a computer workstation, a server, a desktop, a notebook, or a laptop.

Further, the processor or the microprocessor (e.g., CPUs 102) of computing systems and/or devices receives instructions from the memory (e.g., memory 103) and executes these instructions, thereby performing one or more processes, including one or more of the processes described herein. Such instructions and other data may be stored and transmitted using a variety of computer-readable mediums (e.g., memory 103).

A CPU 102 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the CPU 102 may be any one of, but not limited to single, dual, triple, or quad core processors (on one single chip), graphics processing units, visual processing units, and virtual processors.

A memory 103 may be, in general, any computer-readable medium (also referred to as a processor-readable medium) that may include any non-transitory (e.g., tangible) medium that participates in providing data (e.g., instructions) that may be read by a computer (e.g., by CPUs 102 of devices 101, 110, 120, 130). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, the elements of the devices 101, 110, 120, 130 may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the operations described herein.

The connected device 101 may generally be any electronic hardware that includes a central processing unit 102 and a memory 103. The connected device 101 may notify the computing device 101 and by extension the user or third party and obtain/receive the installation consent before proceeding with installation of a software package on the connected device 101.

A software package may be an upgrade of new software and/or bug fixes for a vertical application of the connected device 101, along with operating system upgrades, firmware upgrades, devices drives, application programming interfaces, or the like.

A device driver is a computer routine that controls a particular physical component of device or a peripheral (e.g., a printer) attached to the device. Similar to a device driver is an OS Layer Kernel, which manages and translates input/output requests into data processing instructions for the central processing unit (e.g., CPU 102).

An application programming interface (API) is a set of executable instructions that itemizes and implements the data structures, object classes, and variables that interact with the device drivers to operate physical components and that launch routines and/or programs.

The connected device 101 may also store in the memory 103 and run via the processor 102 a vertical application. A vertical application may be any software application that supports a specific device operation or business process. Vertical applications may be customized to meet the needs of the connected device 101 or user operating the connected device 101.

Thus, the connected device 101 may via the vertical application communicate with the SU device 120 regarding software update availability, software package downloads, and local software status. The connected device 101 may also via the vertical application send and receive indications to and from the computing device 110 and/or the cloud device 130. For example, the connected device 101 may send software update indications to the extended interface application based on a network initiated instruction by the SU device 120 (e.g., a network initiated operation) and receive the installation consent from the extended interface application.

Further, because the connected device 101 may generally operate without a display and/or be unable to support a user interface, the connected device 101 may support a two-way communication, anywhere and anytime, between the connected device 101 and the extended interface application. And, although connected devices 101 do not include displays, connected devices 101 are not limited thereto, as connected devices 101 may have other reasons for leveraging computing devices 110 such as inaccessibility (e.g., a router may have a display and an interface while being located in an inaccessible location, such as a locked network closet). Examples of a connected device 101 may include, without limitation, network routers, network switches, phones, remotes, printers, monitoring equipment, near field communication transmitters and readers, appliances, home appliances, refrigerators, etc.

The computing device 110 may also generally be any hardware that includes a central processing unit 102 and a memory 103. The computing device 110 may further connect to the system 100, include a display, and/or support user interfaces. A display is an output device for presentation of information in visual or tactile form, such as user interfaces or web portals. Thus, a display of a computing device 110 may present user interfaces or a web portal to a user, such that the user may interact with and receive information from the connected device 101 (which generally do not have displays).

For instance, the computing device 110 may store the extended interface application (e.g., extended interface application 210 of FIG. 2 described below) on the memory 103. The computing device 110 may then utilize the processor 102 to operate extended interface application to generate user interfaces on the display. The user interfaces may then acquire the installation consent in support of the SU experiences, alerts, and interactions, such as processing/generating software update available and response indications and receiving inputs from the user or third party.

Examples of a computing device 110 may include, without limitation, desktops, notebooks, laptops, phones, tablets, computer workstations, next generation portable devices, handheld computers, or some other computing system and/or device. Examples of display device technologies may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like.

The SU device 120 may be any hardware that includes a central processing unit 102 and a memory 103 and manages the software packages for the connected device 101 via, e.g., Over-The-Air (OTA) or Firmware Over-The-Air (FOTA) processes. OTA and FOTA processes generally include distributing new software updates, configuration settings, and updated encryption keys to the connected device 101 wirelessly or directly "over the air" (e.g., utilizing wireless mechanisms to send provisioning data or update packages for firmware or software updates to computing systems and/or devices).

For example, the SU device 120 may utilize Device Software Update via the OTA programming that implements the Open Mobile Alliance Device Management protocol, the TR-069 protocol, or a push notification service (e.g., Google Cloud Messaging or Apple Push Notification) to "push out" software packages, which may be initiated via a network 140 or user, to ensure that the connected devices 101 have the latest software improvements.

Alternatively, the SU device 120 may directly communicate with the cloud device 130, the extended interface application, and/or a web portal to leverage existing communication channels between the SU device 120, the cloud device 130, and other devices 101, 110. Therefore, the SU device 120 may provide a central location for pushing updates and/or software packages to all the connected devices 101 on the network 140.

The cloud device 130 may be any hardware that includes a central processing unit 102 and a memory 103 and manages the communications (e.g., software update available and response indications) between the connected device 101 and the computing device 110. In general, when a computing device 110 is not within a radio range (as described below) of the connected device 101, the cloud device 130 may communicate (see Arrows B, C) indications between the connected device 101 and the computing device 110. The cloud device 130 may also include the extended interface application for access by a web portal of the computing device 110. Therefore, the cloud device 130 provides a central location for receiving and transferring communications to all the connected devices 101 on the network 140.

Further, the SU device 120 and the cloud device 130 may be servers. In general, a server may be any computing system and/or device (as described above) acting as databases, data repositories or other data stores that includes any type of data source and/or file system that operates to acquire the installation consent in support the SU experiences, alerts, and interactions. For instance, data sources may include data management client, along with licenses (e.g., license the permit control and access to the device by third parties platforms) relating to a data management access and configurations and/or device operability.

A device management client may include executable instructions that manage the connected device 101 and/or computing device 110 by setting configurations and diagnostics based on a particular protocol. Device management clients generally manage via provisioning, configuring, fault managing, and upgrading operations. Provisioning is the enabling and disabling of both physical device components and software components. Configuring is the changing of settings and/or parameters of the device. Fault managing is the monitoring and (sometimes) correcting of errors generated by the physical and software components.

Further, databases, data repositories or other data stores (e.g., the SU device 120 and the cloud device 130) described herein may generally include various kinds of mechanisms for storing, providing, accessing, and retrieving various kinds of data, including a hierarchical database, a set of files in a file system, an application database in a proprietary format, a relational database management system (RDBMS), etc. Each such data store may generally be included within or external to a computing system and/or device (e.g., the SU device 120 and the cloud device 130) employing a computer operating system such as one of those mentioned above, and/or accessed via a network (e.g., network 140) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

A network 140 may provide the infrastructure through which the devices 101, 110, 120, 130 communicate. In general, a network (e.g., network 140) may be a collection of computers and other hardware to provide infrastructure to establish virtual connections and carry communications. For instance, a network may be an infrastructure that generally includes edge, distribution, and core devices (e.g., tower 141 or network devices 142) and enables a path (e.g., connections 147, 148, 149) for the exchange of information between different devices and systems (e.g., between the devices 101, 110, 120, 130). Further, a network may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications. The network 140 is representative, and thus while a single cloud illustrates the network 140, this illustration may represent a single network, a combination of different networks components and technologies, and/or a plurality of networks, as described above.

Figure 1B:
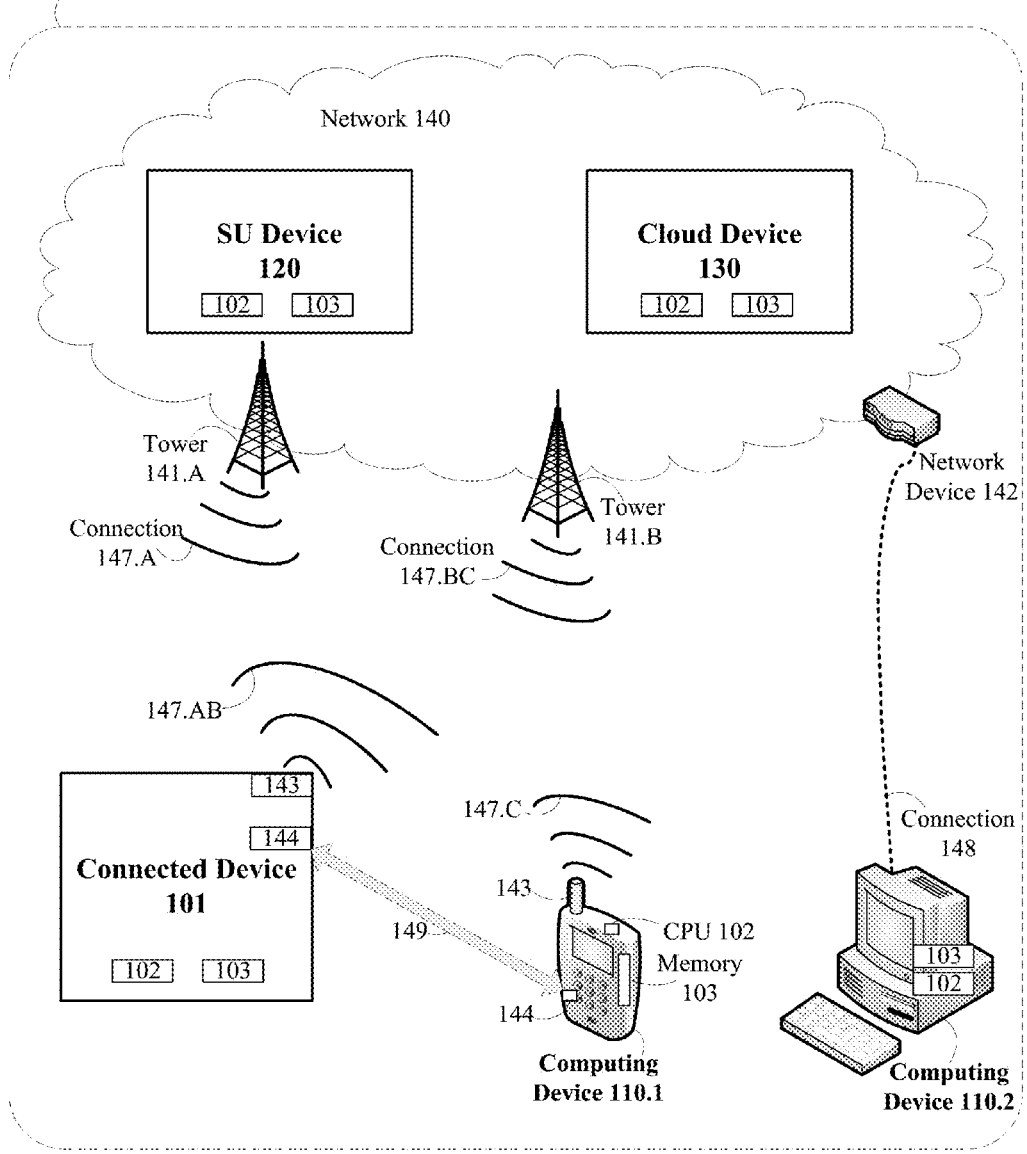

FIG. 1B illustrates exemplary infrastructure components that support the communication operations between the devices 101, 110, 120, 130 of FIG. 1A (note that items that have been previously discussed may be utilized to denote the same or similar items in subsequent figures). The exemplary infrastructure components may include towers 141, network devices 142, transceivers 143, 144, and connections 147, 148, 149. Additionally, FIG. 1B includes computing devices 110.1 and 110.2 to illustrate the different exemplary communication operations.

The towers 141 may be tall structures designed to support antennas or aerials for telecommunications amongst the exemplary system 100. The tower 141 may enable the connections 147 that carry signals to or from the network 140 (e.g., the connection 147.A from the network 140 via the tower 141.A to the connection 147.AB via the transceiver 143 of the connected device 101, and the connection 147.BC from the network 140 via the tower 141.B to either the connection 147.AB via the transceiver 143 of the connected device 101 or the connection 147.C via the transceiver 143 of the computing device 110.1).

The network device 142 may be a computing system and/or device as described above that is a gateway between connection 148 and the network 140 to complete a communication path (e.g., Arrow C of FIG. 1) between the computing device 110.2 and the devices 120, 130 of the network 140.

The transceivers 143, 144, may be any connector used for digital or analog signal transfers. For instance, the transceivers 143 may be any antenna technology, such as cellular, Wi-Fi, or the like, that implements a wireless exchange of data by converting propagating electromagnetic waves to and from conducted electrical signals. For example, the transceivers 143 may be an antenna technology that implements radio technology, such as Wi-Fi, near field communication, Bluetooth®, or the like, which is used to exchange data wirelessly using radio waves over a range that enables communication. Therefore, the connected device 101 may communicate with the computing device 110.1 either directly or through the cloud device 130, based on a need of the exemplary system 100.

The connections 147, 148, 149 may be wired or wireless connections between two endpoints (devices or systems) that carry electrical signals that facilitate virtual connections. Examples of connections 147, 148, 149 may be any transmission media including radio waves, metal wire, fiber optics, and the like. Virtual connections are comprised of the protocol infrastructure that enables communication (see Arrows A-D) to and from devices 101, 110, 120, 130. For instance, connections 147 may be wireless connections between the towers 141 and the transceivers 143 of the connected device 101 and the computing device 110.1; connection 148 may be a wired connections between the computing device 110.2 and network device 142; and connection 149 may be a wireless connection using radio waves over a radio range between the transceivers 144 of the connected device 101 and the computing device 110.1. Further, the combination of connections 147, 148, 149 support the virtual connections of the exemplary system 100.

The computing devices 110.1 and 110.2 are examples of the computing device 110 of FIG. 1, with the computing device 110.1 being a smartphone and the computing device 110.2 being a desktop. The memory 103 of both computing devices 110.1 and 110.2 stores an extended interface application (e.g., extended interface application 210 of FIG. 2 described below), which may be utilized by the respective processor 102 to generate user interfaces to acquire the installation consent. The extended interface application will now be described with reference to the exemplary schematic of FIG. 2.

Figure 2:
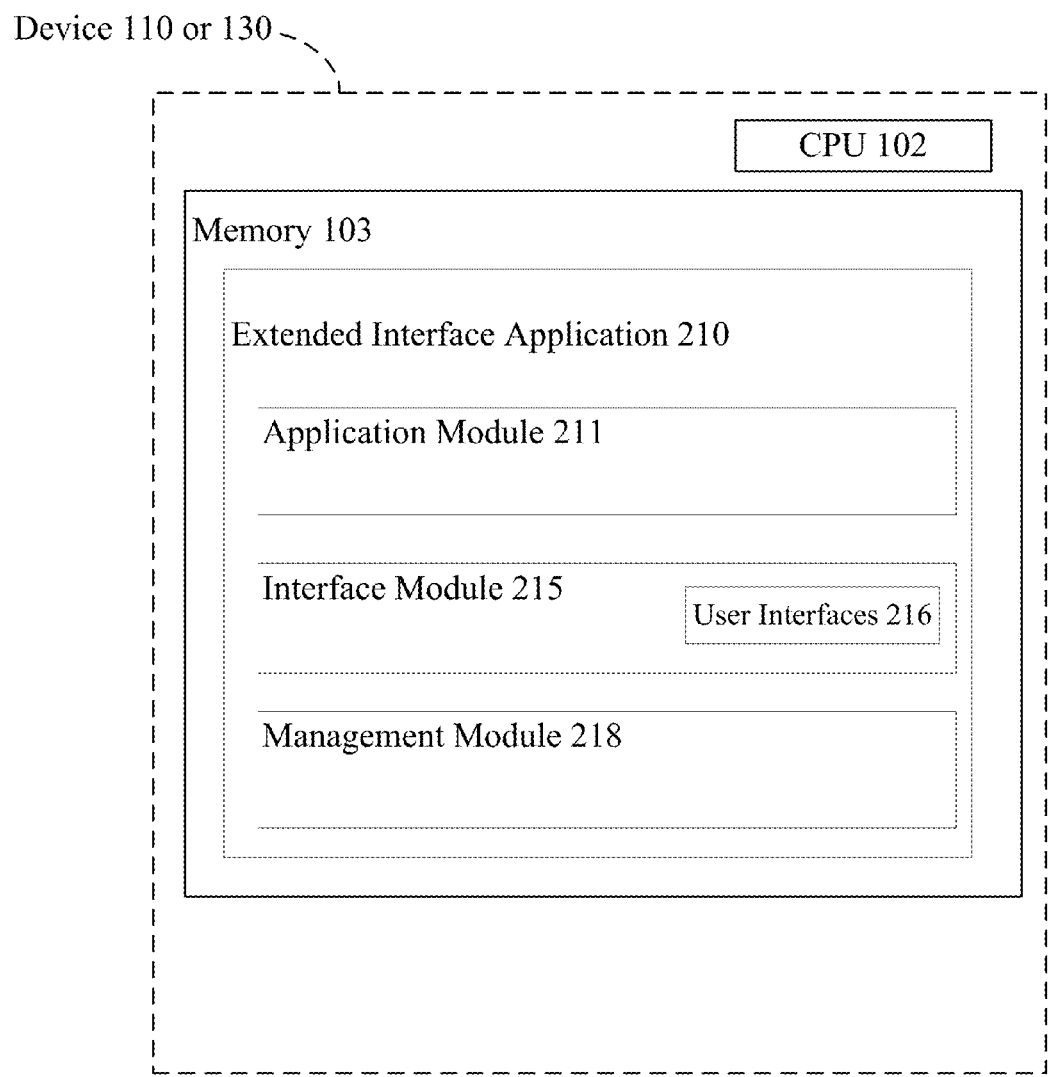
FIG. 2 illustrates an exemplary schematic of an application of a computing device.

FIG. 2 illustrates an extended interface application 210 stored on a memory 130 of a computing device 110 or cloud device (as illustrated by the dashed-box). The extended interface application 210 includes an application module 211, an interface module 215 that generates user interfaces 216, and a management module 218. Although one modular breakdown of the extended interface application 210 is offered, it should be understood that the same functionality may be provided using fewer, greater, or differently named modules. Further, although it is not shown, the interface module 215 and the application module 218 may be integrated with any of the above named modules. Also, as another alternative example, the operability of the extended interface application 210 may be divided between the devices 101, 110, 120, 130, where modules 211, 215, 218 may be located separately on different devices and accessed through distributed computing, such that the operability is provided for, shared, and relied upon by other devices. Finally, a single computing device may be independently configured to include the entire operability of the extended interface application 210, as illustrated in FIG. 2.

The extended interface application 210 may generally be operated by the computing device 110 and/or cloud device 130. For instance, the application module may receive and forward indications from the devices 101, 120, 130 of the exemplary system 100 to the management module 218. The management module 218 may process these indications to support the generation of user interfaces 216 by the interface module 215, which may provide notifications to (as described below) and receive inputs from (e.g., installation consent) the user or third party. For example, the user interfaces 216 may receive inputs that initiate indications (e.g., a user initiated operation), which when sent by the application module 211 trigger the installation of the software package on the connected device 101.

In an exemplary operation, the extended interface application 210 may notify a user (e.g., via the user interfaces 216 of the computing device 110 or a web portal accessing the user interfaces 216 of the cloud device 130) as soon as extended interface application 210 receives an update available indication from the connected device 101. The extended interface application 210 may clearly present to the user that the update available indication is a software package for the connected device 101 and not a software update for the extended interface application 210. When user responds to the update available indication (e.g., the extended interface application 210 receives an input), the extended interface application 210 may immediately send the response, as a response indication, back to the connected device 101. If the extended interface application 210 is not active or the web portal is not open when the connected device 101 sends the update available indication to the extended interface application 210, the notification may be presented to the user as soon as the extended interface application 210 or the web portal connects.

The application module 211 may include a set of executable instructions configured to facilitate communication between the sub-modules of the extended interface application 210 and hardware/software components external to the extended interface application 210, including devices 101, 110, 120, 130. That is, the application module 211 may be configured to communicate directly with other applications, modules, models, devices, systems, and other sources through both physical and virtual interfaces. Further, the application module 211 may include executable instructions and specifications for routines, data structures, object classes, and variables that receive, package, present, and transfer data through a connection or over a network 140, as further described below. For example, the application module 211 may be configured to receive instructions from the interface module 215 or sources external to the computing device 110 and, based on those instructions, forwards the instructions to the management module 218. The application module 211 may also manage the dispatching and receipt of information along with integrating the extended interface application 210 with other applications and drivers, as needed per operating system.

The interface module 215 may include a set of executable instructions for generating and managing user interfaces 216, which based on a received input, authorize the installation of the software package on the connected device 101. For instance, the interface module 215 may be configured to generate, present, and provide one or more user interfaces 216 (e.g., in a menu, icon, tabular, map, pop-up, or grid format) in connection with other modules for presenting information and receiving inputs (e.g., indications of acceptance, deference, or rejection of the software package and/or configuration adjustments altering, updating, or changing the device settings). The inputs received by the user interfaces 216 may generally be communicated by interface module 215 to the application module 211, which in turn forwards the inputs to the management module 218 for processing.

User interfaces 216 may include notifications such as banners, icons, badges, alerts, sounds, text, or any combinations thereof. A banner may be a media or drop-down menu that extends from a top portion of an interface, a sub-interface, and/or display of a computing device 110 and that may include text, badges, and animated symbols. An icon and/or a badge may be a number or symbol that signals a link, an event, or a number of events. An alert may be a pop-up window that may be centered on the display and that may include text, badges, and animated symbols.

One example of a user interface 216 may include a presentation of an 'Update Notification' alert when notifying a user or third party of an available software package: "This software update includes enhancements to your [Make] [Model]. The update will take about [X] minutes," where [Make] is the manufacturer of the device, [Model] is the model name of the device at sale, and [X] is the expected maximum update time in minutes. The 'Update Notification' alert may also include selectable option, such as "Install Now," "Install Later," and "No Thanks" buttons.

Another example of a user interface 216 may include a presentation of a '15th Day Deferral Notification' alert when the connected device 101 does not receive installation consent within fourteen days of the initial update available indication: "This software update includes enhancements to your [Make] [Model]. The update will take about [X] minutes. If no action is taken, the installation will start automatically after [Y minutes]," where [Y minutes] is the expected countdown timer when the installation will automatically start if no action is taken. The '15th Day Deferral Notification' alert may also include the selectable option, such as an "Install Now" button.

Other examples of user interfaces 216 may include a presentation of an 'Update in Progress Notification' alert during software package installation (e.g., "This software update for your [Make] [Model] is in progress," along with a selectable "OK" button and a progress bar); a 'Successful Update Notification' alert after a successful software package installation (e.g., "Your [Make] [Model] was updated successfully," along with a selectable "OK" button that clears this notification); and an 'Unsuccessful Update Notification' alert after an unsuccessful software package installation (e.g., "There was a problem updating your <Make> <Model>. No changes were made," along with a selectable "OK" button that clears this notification).

The interface module 215 may further generate new and unique interfaces particular to the extended interface application 210. The interface module 215 may also commandeer or utilize interface formatting local to the device in which the extended interface application 210 is stored thereon (e.g., appropriating interfaces of the computing device 110 or web portal interfaces for providing notifications and receiving inputs). The interface module 215 may thus generate or utilize local, terminal, web-based, and mobile interfaces and any similar interface that presents and receives information relative to the connected device 101.

The management module 218 may include a set of executable instructions configured to generate and process indications. The management module 218 may also make determinations as to whether the indications are initiated by the network 140 (e.g., operation initiates from a source other than input) or a user (e.g., operation initiates from an input). For instance, the management module 218 is configured to receive software update available indications through the application module 211, e.g., from the cloud device 130 (see Arrow C) or the connecting device 101 (see Arrow D). Further, the management module 218 may send instructions to the interface module 215 via the application module 211 to generate user interfaces 216 that provide update or update available notifications. In turn, the management module 218 may receive and process inputs communicated by interface module 215 via the application module 211 to determine if a user or third party has indicated acceptance, deferral, or rejection of the software package. Based on the input, the management module 218 generates and forwards a response indication through the application module 211 to the cloud device 130 (see Arrow C) or the connecting device 101 (see Arrow D).

Communication operations of the above exemplary system 100 and extended interface application 210 will now be described with reference to the exemplary process flows of FIGS. 3-5. While the exemplary process flows are shown in the FIGS. 3-5, these flows are not intended to be limiting. Indeed, additional or alternative flows and/or implementations may be used.

The following sample flows describe the SU experiences, alerts, and interactions that related to a network initiated software update operation and a user initiated software update operation. Both the network and user initiated software update operations may be associated with a package severity, such as a mandatory or an optional severity. Mandatory package severity ("mandatory severity") is a software package designation set by the SU device 120 indicating that a particular software package must be installed on the connected device. In turn, a software package with a mandatory severity may be accepted or deferred but not rejected. Optional package severity ("optional severity") is a software package designation set by the SU device 120 indicating that a particular software package may be installed on the connected device, and thus a software package with an optional severity may be accepted, deferred, or rejected.

Figure 3:
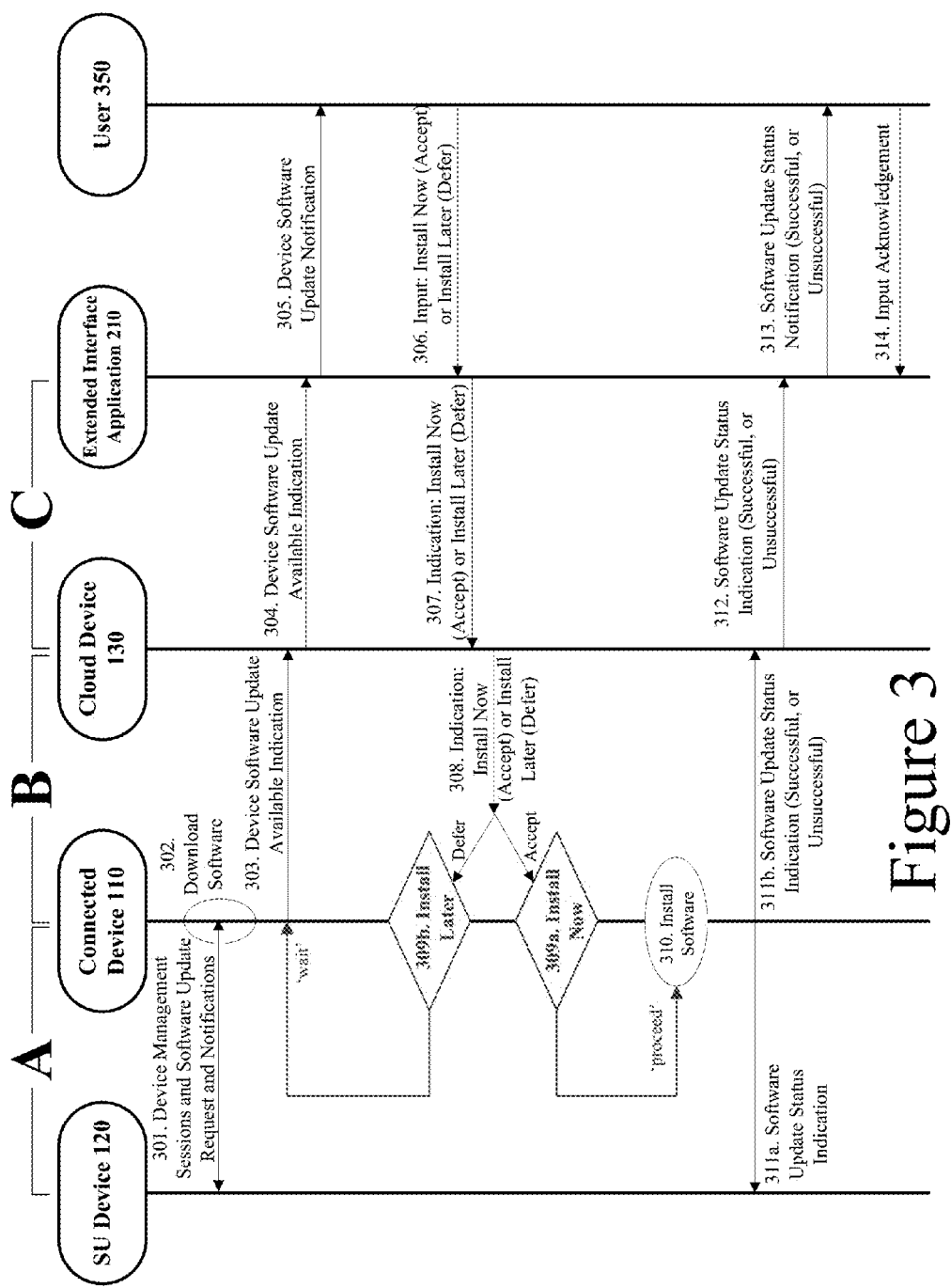
FIG. 3 illustrates an exemplary process flow regarding a network initiated operation relating to a mandatory severity software package.
Figure 4:
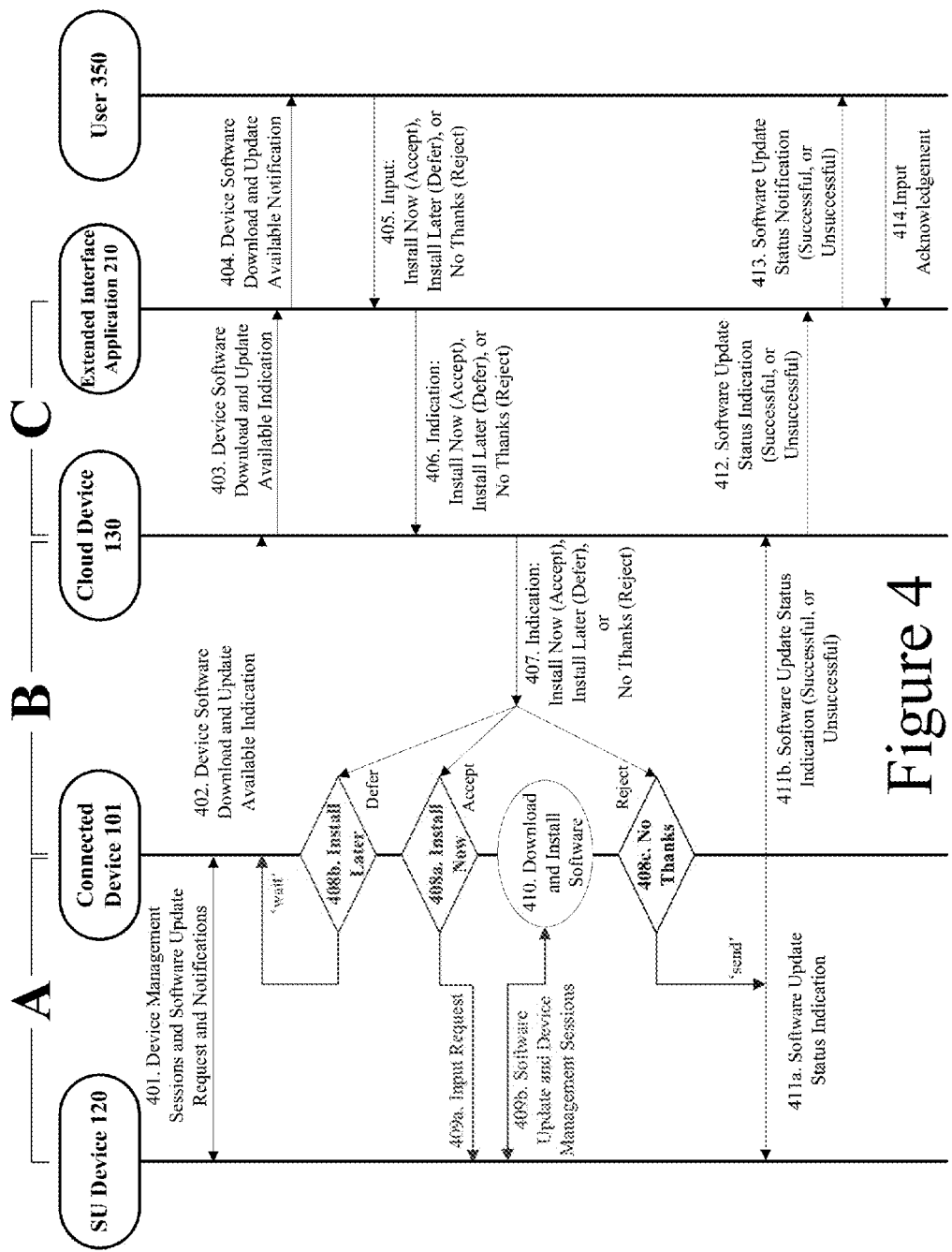
FIG. 4 illustrates an exemplary process flow regarding a network initiated operation relating to an optional severity software package.
Figure 5:
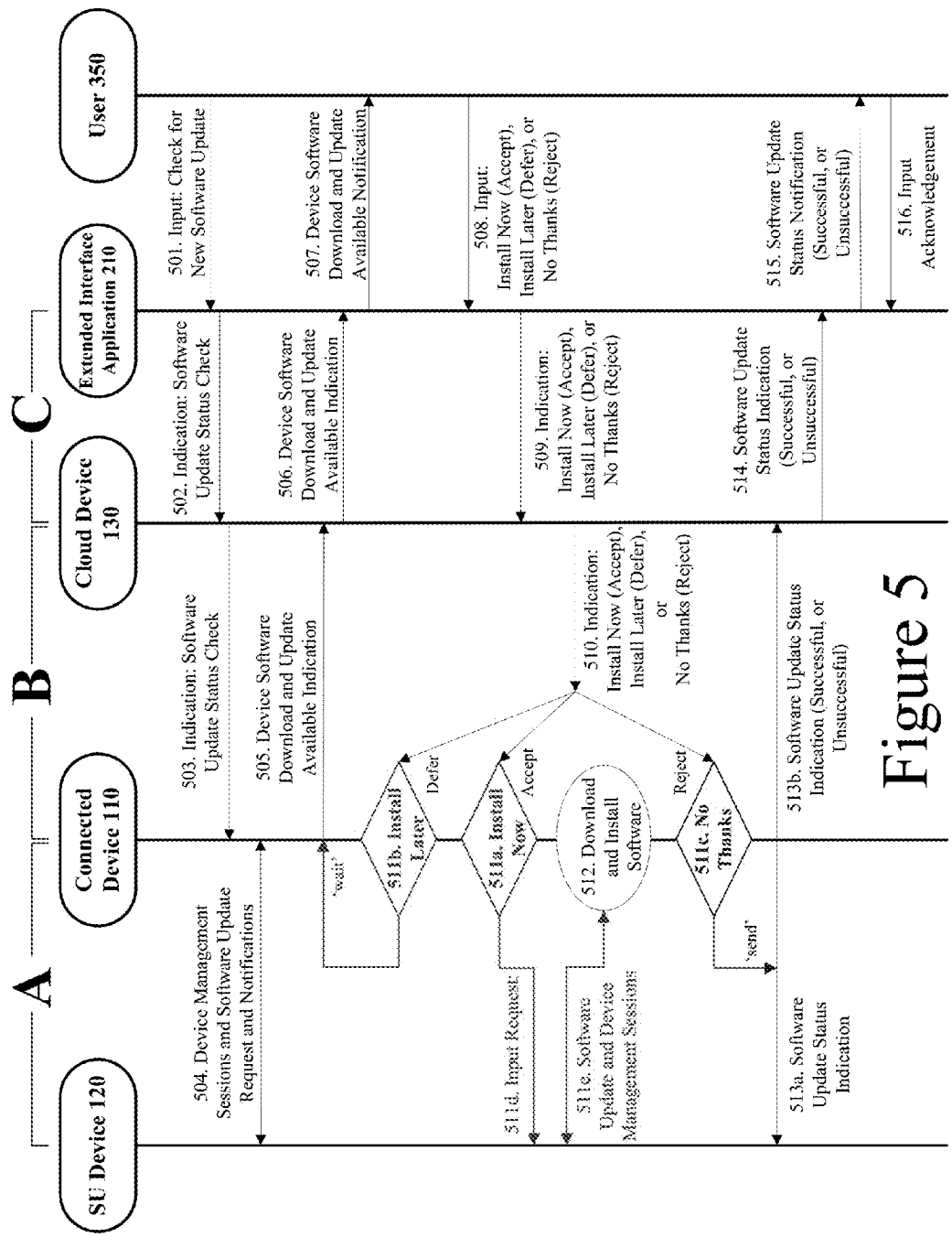
FIG. 5 illustrates an exemplary process flow regarding a user initiated operation relating to a mandatory or optional severity software package.

In FIGS. 3-5, communication operations between the SU device 120 and the connected device 110 are designated as 'A' operations in relationship to Arrow A of FIG. 1A; communication operations between the connected device 110 and the cloud device are further designated as 'B' operations in relationship to Arrow B of FIG. 1A; and communication operations between the cloud device and the extended interface application 210 are further designated as 'C' operations in relationship to Arrow C of FIG. 1A.

FIG. 3 illustrates an exemplary process flow regarding a network initiated operation relating to a mandatory severity software package. In the case of FIG. 3, the network initiated operation is a software package update pushed (and thus initiated) by the SU device 120 to connected devices.

In FIG. 3, the SU device 120 may inform 301 the connected device 101 that a software package is available to download, which may be carried out by scheduled device management sessions, software update requests, and/or software update notifications between the SU device 120 and the connected device 101. When available, the connected device 110 downloads 302 (as indicated by the ellipse in FIG. 3) the software package from the SU device 120.

After the connected device 101 completes the download of the software package, the connected device 101 sends 303 a device software update available indication to the cloud device 130. The cloud device 130 in turn forwards 304 the device software update available indication to the extended interface application 210.

The extended interface application 210 processes the indication to generate or provide 305 a device software update notification that informs the user 350 (or third party) that the software package has been downloaded and is ready to be installed on the connected device 101. For example, the extended interface application 210 may generate a local user interface 216 that presents the notification or may provide the notification to a web portal being utilized by a user 350. The extended interface application 210 may also generate the device software update notification to include the expected maximum update time in minutes, which may be predetermined by the SU device 120 (such as the 'Update Notification' described above). Further, since the software package is of a mandatory severity, the input may include the selectable options of: "Install Now" (accept) and "Install Later" (defer).

The extended interface application 210 then receives 306 an input from the user 350 via the user interface 216 or web portal. The input may indicate the selection of "Install Now" (accept) and "Install Later" (defer) by the user 350. The extended interface application 210 processes the input to generate a response indication that reflects the selection by the user 350. The extended interface application 210 then sends 307 the response indication to the cloud device 130, which in turn forwards 308 the response indication to the connected device 101. If the device software update notification is not responded to before powering off the computing device 110, the computing device 110 at next power up may display the 'Update Notification' alert with one selectable option: "Install Now."

Next, the connected device 101 will either determine to immediately install the software package, when there is an 'Accept' indication—as illustrated, or defer installation to a later time, when there is a 'Defer' indication—as illustrated, based on processing the response indication received from the cloud device 130. Note that while a communication (308) in FIG. 3 splits into multiple paths that are received by multiple blocks, the splitting is merely illustrative.

If the response indication identifies 309a that the user 350 selected to 'Accept' the software package installation ("Install Now"), then the connected device 101 performs 310 (proceed') the installation. During the software package installation, the connected device 101 may communicate the progress of the installation to the extended interface application 210. In turn, the extended interface application 210 may present via the interface module 215 the 'Update in Progress Notification' alert described above.

If the response indication identifies 309b that the user 350 selected to 'Defer' the software package installation ("Install Later"), then the connected device 101 pauses (wait') for a predetermined time to send 303 a subsequent device software update available indication to the cloud device 130. The predetermined time may be a maximum of 24 hours after the user 350 selected to defer the software package installation. The resulting subsequent device software update notification may be a reminder that a software package with a mandatory severity is awaiting installation consent.

If the connected device 101 does not receive installation consent within fourteen days of the initial device software update available indication, then on the fifteenth day the connected device 101 may initiate the presentation of a '15th Day Deferral Notification' alert by the extended interface application 210 as described above. If the '15th Day Deferral Notification' alert is not responded to within a specified amount time of receipt of notice, the connected device 101 may initiate presentation an 'Update in Progress Notification' alert by the extended interface application 210 to the user 350 while the connected device 101 automatically proceeds with the software package update.

Based on the success or failure of the installation, the connected device 101 forwards software update status indications to the SU device 120 (see 311a) and the cloud device 130 (see 311b). Additionally, the connected device 101 may notify the SU device 120 when there is a deferral of the software package update via the software update status indications (see 311a).

After receipt, the cloud device 130 forwards 312 the software update status indication to the extended interface application 210. The extended interface application 210 processes the indication to generate or provide 313a software update status notification that informs the user 350 of the software package status (e.g., whether installation was successful or unsuccessful). For example, the extended interface application 210 may generate a 'Successful Update Notification' alert after a successful software package update or an 'Unsuccessful Update Notification' alert when a software package update was unsuccessful, as described above. The extended interface application 210 then receives 314 an input from the user 350 via the user interface 216 or web portal. The input may indicate the selection of an "OK" button by the user 350 (e.g., acknowledge of the software package status), which in turn clears the software update status notification.

FIG. 4 illustrates an exemplary process flow regarding a network initiated operation relating to an optional severity software package. In FIG. 4, the SU device 120 may inform 401 the connected device 101 that a software package is available to download, which may be carried out by scheduled device management sessions, software update requests, and/or software update notifications between the SU device 120 and the connected device 101. The connected device 101 sends 402 a device software download and update available indication to the cloud device 130. The cloud device 130 in turn forwards 403 the indication to the extended interface application 210.

The extended interface application 210 processes the indication to generate or provide 404 a device software download and update available notification that informs the user 350 (or third party) that the software package may be downloaded to and installed on the connected device 101. The device software download and update available notification may include the selectable options of "Install Now" (accept), "Install Later" (defer), and "No Thanks" (reject), since the software package is of an optional severity.

Next, the extended interface application 210 receives 405 an input. The input may indicate the selection of "Install Now" (accept), "Install Later" (defer), or "No Thanks" (reject) by the user 350. The extended interface application 210 then processes the input to generate or provide a response indication. The extended interface application 210 then sends 406 the response indication the cloud device 130, which in turn forwards 407 the response indication to the connected device 101. Similarly to the software package with a mandatory severity, if the device software download and update available notification is not responded to before powering off the computing device 110, the computing device 110 at next power up may display the 'Update Notification' alert with the selectable option of "Install Now."

Next, the connected device 101 will either determine to immediately install the software package, when there is an 'Accept' indication—as illustrated; defer installation to a later time, when there is a 'Defer' indication—as illustrated; or not install the software package when there a 'Reject' indication—as illustrated, based on processing the response indication received from the cloud device 130. Note that while a communication (407) in FIG. 4 splits into multiple paths that are received by multiple blocks, the splitting is merely illustrative.

If the response indication identifies 408a that the user 350 selected to 'Accept' the software package installation ("Install Now"), then the connected device 101 forwards 409a an input request to the SU device 120 to execute a software update and device management session 409b that enables the connected device 101 to download 410 and install the software package. During the software package installation, the connected device 101 may initiate presentation the 'Update in Progress Notification' alert described above. Next, based on the success or failure of the installation, the connected device 101 forwards software update status indications to the SU device 120 (see 411a) and the cloud device 130 (see 411b).

If the response indication identifies 408b that the user 350 selected to 'Defer' the software package installation ("Install Later"), then the connected device 101 pauses (wait') for a predetermined time to send 402 a subsequent device software download and update available indication to the cloud device 130. The predetermined time may similarly be a maximum of 24 hours after the user 350 selected to defer the software package installation. The resulting subsequent device software download and update available notification may be a reminder that a software package with an optional severity is awaiting download and installation consent. Further, the connected device 101 may notify (see 411a) the SU device 120 when there is a deferral of the software package update via a software update status indication.

If the response indication identifies 408c that the user 350 selected to 'Reject' the software package installation ("No Thanks"), then the connected device 101 forwards (send') a software update status indication to the SU device 120 and terminates the process flow of FIG. 4.

In the case of immediate installation (see 408a, 409a, 409b, 410) and after receipt of the software update status indication (411b), the cloud device 130 forwards 412 the indication to the extended interface application 210. The extended interface application 210 processes the indication to generate or provide 413 a software update status notification that informs the user 350 of the software package status (e.g., whether installation was successful or unsuccessful as described above). The extended interface application 210 then receives 414 an input from the user 350 via the user interface 216 or web portal. The input may indicate the selection of an "OK" button by the user 350 (e.g., acknowledge of the software package status), which in turn clears the software update status notification.

FIG. 5 illustrates an exemplary process flow regarding a user initiated operation relating to a mandatory or optional severity software package. In the case of FIG. 5, the user initiated operation is a software package update pushed by the SU device 120 to connected devices based on a request from (and thus initiated by) a user.

In FIG. 5, the extended interface application 210 may receive 501 an input from the user 350 via the user interface 216 or web portal a user 350. The input may indicate a request to check for the status of new software packages for the connected device 101. The extended interface application 210 may in turn process the input to generate and forward 502 a software status update check indication to the cloud device 130. Upon receipt, the cloud device 130 may further forward 503 the indication to the connected device 110. The connected device 101 may then communicate with (e.g., send a software update request to) the SU device 120 to acquire 504 a software package status (e.g., via a device management session and/or software update notification between the SU device 120 and the connected device 101).

The connected device 101 based on the software package status sends 505 a device software download and update available indication to the cloud device 130, without downloading the software package from the SU device 120. The cloud device 130 in turn forwards 506 the indication to the extended interface application 210.

The extended interface application 210 processes the indication to generate or provide 507 a device software download and update available notification that informs the user 350 (or third party) whether the software package status indication 411a is available for downloading to and installing on the connected device 101. When the software package is available, the notification may include at least the selectable options of "Install Now" (accept) and "Install Later" (defer). If the software package is of an optional severity, then the notification may also include the selectable option of "No Thanks" (reject).

Next, the extended interface application 210 receives 508 an input from the user 350 via the user interface 216 or web portal. The input may indicate the selection of "Install Now" (accept), "Install Later" (defer), or "No Thanks" (reject) by the user 350. The extended interface application 210 then processes the input to generate or provide a response indication. The extended interface application 210 then sends 509 the response indication to the cloud device 130, which in turn forwards 510 the response indication to the connected device 101.

Next, the connected device 101 will either determine to immediately install the software package, when there is an 'Accept' indication—as illustrated; defer installation to a later time, when there is a 'Defer' indication—as illustrated; or not install the software package, when there a 'Reject' indication—as illustrated, based on processing the response indication received from the cloud device 130. Note that while a communication (510) in FIG. 5 splits into multiple paths that are received by multiple blocks, the splitting is merely illustrative.

If the response indication identifies 511*a* that the user 350 selected to 'Accept' the software package installation ("Install Now"), then the connected device 101 forwards 511*d* an input request to the SU device 120 to execute a software update and device management session 511*e* that enables the connected device 101 to download 112 and install the software package. During the software package installation, the connected device 101 may initiate presentation the 'Update in Progress Notification' alert described above. Next, based on the success or failure of the installation, the connected device 101 forwards software update status indications to the SU device 120 (see 513*a*) and the cloud device 130 (see 513*b*).

If the response indication identifies 511*b* that the user 350 selected to 'Defer' the software package installation ("Install Later"), then the connected device 101 pauses (wait') for a predetermined time to send 505 a subsequent device software download and update available indication to the cloud device 130. The predetermined time may similarly be a maximum of 24 hours after the user 350 selected to defer the software package installation. The resulting subsequent device software download and update available notification may be a reminder that a software package with a mandatory or an optional severity is awaiting download and installation consent. Further, the connected device 101 may notify (see 513*a*) the SU device 120 when there is a deferral of the software package update via a software update status indication.

If the response indication identifies 511*c* that the user 350 selected to 'Reject' the software package installation ("No Thanks"), then the connected device 101 forwards (send') a software update status indication 513*a* to the SU device 120 and terminates the process flow of FIG. 5.

In the case of immediate installation (see 511*a*, 511*d*, 512) and after receipt of the software update status indication (513*b*), the cloud device 130 forwards 514 the software update status indication to the extended interface application 210. The extended interface application 210 processes the indication to generate or provide 515 a software update status notification that informs the user 350 of the software package status (e.g., whether installation was successful or unsuccessful as described above). The extended interface application 210 then receives 516 an input from the user 350 via the user interface 216 or web portal. The input may indicate the selection of an "OK" button by the user 350 (e.g., acknowledge of the software package status), which in turn clears the software update status notification.

Thus, the above system and method avoids unannounced software updates by acquiring installation consent through flexibility of software package indications/notifications and based on configurability of the connected device 101, computing device 110, the SU device 120, the cloud device 130, the need of the user 350 (or authorized third party), and specific vertical needs of the system and method. That is, the system and method avoids unannounced software updates by acquiring installation consent by a user 350 through the communication of the connected devices without displays 101 with computing devices with displays 110.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
  a first device without a display and having a first processor that provides operations including:
    sending a software package request notification from the first device without the display, to a second device with the display,
    receiving a response indication from the second device with the display, the response providing:
      a software package,
      a severity indication of the software package associated with at least one of a mandatory severity and an optional severity, and
      an installation consent of a user for at least one of an automatic installation and a defer installation,
    determining, before an installation of a software package on the first device without the display, whether installation consent of a user has been provided for the at least one of the automatic installation and the defer installation based on the response from the second device with the display and the identified at least one of the mandatory severity and the optional severity, thereby avoiding an unannounced software update,
    in response to the identified mandatory severity and the installation consent being automatic installation, proceeding with the installation of the software package on the first device without the display, or in response to the identified optional severity or the installation consent being deferred install, pausing for a first predetermined time period when the response indication from the second device with the display indicates selection of a defer option, sending a deferral notification to the second device with the display after the first predetermined time period, automatically proceeding with the installation of the software package on the first device without the display if the deferral notification is not responded to in a specified time period of the deferral notification, or deferring installation if the deferral notification is responded to the specified period of the deferral notification and indicates a second predetermined time period, sending a subsequent software package indication to the second device with the display after the second predetermined time period, receiving a second response from the second device with the display, and proceeding with installation of the software package on the first device without the display when the second response indication is determined to indicate acceptance of the software package; and the second device with the display that provides operations including:

receiving the software package indication from the first device without the display, generating the software package including the severity indication and the installation consent, receiving an input responsive to the at least one of the deferral and second notifications, generating the response based on the input indicating at least one of the automatic installation and the deferred installation of the software package, and sending the response from the second device with the display to the first device without the display.

2. The system of claim 1, further comprises:
a third device configured to utilize a web portal to:
access the at least one of the deferral and subsequent deferral notification of the second device and
supply the input to the second device, and
wherein the first device is a connected device without the display,
wherein the second device is a computing device, and
wherein the second application is an extended interface application that generates the at least one of the deferral and subsequent deferral notifications.

3. The system of claim 1, wherein the software package request notification from the first device without the display instructs the second device with the display to generate at least one of the deferral and subsequent deferral notifications to include accept and defer options but not a reject option when the software package request notification identifies that the software package is of the mandatory severity.

4. The system of claim 1, wherein at least one of the deferral and subsequent deferral notifications further include a reject option when the software package request notification identifies that the software package is of the optional severity.

5. The system of claim 1, wherein the operations of the first device further comprise:
proceeding with the installation of the software package on the first device without the display when the response from the second device with the display is determined to indicate selection of an accept option.

6. The system of claim 1, wherein the second device is a computing device that stores an extended interface application that generates at least one of the deferral and subsequent deferral notifications; and
wherein the first device is a connected device without the display.

7. A method, comprising:
sending a software package request notification from a first device without a display and having a processor to a second device with the display;
sending by the second device to the first device a response, the response providing:
a software package,
a severity indication of the software package associated with at least one of a mandatory severity and an optional severity, and
an installation consent of a user for at least one of an automatic installation and a defer installation,
determining, before an installation of a software package on the first device without the display, whether installation consent of the user has been provided for the at least one of the automatic installation and the defer installation based on the response from the second device with the display and the identified at least one of the mandatory severity and the optional severity, thereby avoiding an unannounced software update;
in response to the identified mandatory severity and the installation consent being automatic installation, proceeding with installation of the software package on the first device without the display, or
in response to the identified optional severity or the installation consent being deferred install,
pausing for a first predetermined time period when the response from the second device with the display indicates selection of a defer option,
sending a deferral notification to the second device with the display after the first predetermined time period,
automatically proceeding with the installation of the software package on the first device without the display if the deferral notification is not responded to in a specified time period of the deferral notification, or deferring installation if the deferral notification is responded to in the specified period of the deferral notification and indicates a second predetermined time period,
sending a subsequent deferral notification to the second device with the display after the second predetermined time period,
receiving a second response from the second device with the display, and
proceeding with installation of the software package on the first device without the display when the second response is determined to indicate acceptance of the software package.

8. The method of claim 7, further comprises:
proceeding with the installation of the software package on the first device without the display when the response from the second device with the display is determined to indicate selection of an accept option included in at least one of the deferral and subsequent deferral notifications.

9. A computing device including a first device without a display and having a processor that provides operations comprising:
  sending a software package request notification from the first device without the display and having the processor,
  receiving a response from a second device with the display, the response providing:
    a software package,
    a severity indication of the software package associated with at least one of a mandatory severity and an optional severity, and
    an installation consent of a user for at least one of an automatic installation and a defer installation,
  determining, before an installation of a software package on the first device without the display, whether installation consent of the user has been provided for the at least one of the automatic installation and the defer installation based on the response from the second device with the display and the identified at least one of the mandatory severity and the optional severity, thereby avoiding an unannounced software update;
  in response to the identified mandatory severity and the installation consent being automatic installation, proceeding with installation of the software package on the first device without the display; or
  in response to the identified optional severity or the installation consent being deferred install,
    pausing for a first predetermined time period when the response from the second device with the display indicates selection of a defer option,
    sending a deferral notification to the second device with the display after the first predetermined time period,
    automatically proceeding with the installation of the software package on the first device without the display if the deferral notification is not responded to in a specified time period of the deferral notification, or deferring installation if the deferral notification is responded to in the specified period of the deferral notification and indicates a second predetermined time period,
    sending a subsequent deferral notification to the second device with the display after the second predetermined time period,
    receiving a second response from the second device with the display, and
    proceeding with installation of the software package on the first device without the display when the second response is determined to indicate acceptance of the software package.

10. The computing device of claim 9, the operations further comprising:
  instructing the second device with the display to generate accept and defer options but not a reject option when the software package request notification identifies that the software package is of the mandatory severity.

11. The computing device of claim 9, wherein at least one of the deferral and subsequent deferral notifications further includes a reject option when the software package request notification identifies that the software package is of the optional severity.

12. The computing device of claim 9, the operations further comprising:
  proceeding with the installation of the software package on the first device without the display when the response from the second device with the display is determined to indicate selection of an accept option.

13. The computing device of claim 9, wherein the second device is a second computing device that stores an extended interface application that generates at least one of the deferral and subsequent deferral notifications; and
  wherein the first device is a connected device without the display.

14. A non-transitory computer-readable medium tangibly embodying computer executable instructions that are executable to provide operations comprising:
  send a software package request notification from a first device without a display and having a processor,
  receive a response from a second device with the display, the response providing:
    a software package,
    a severity indication of the software package associated with at least one of a mandatory severity and an optional severity, and
    an installation consent of a user for at least one of an automatic installation and a defer installation,
  determine, before an installation of a software package on the first device without the display, whether installation consent of the user has been provided for the at least one of the automatic installation and the defer installation based on the response from the second device with the display and the identified at least one of the mandatory severity and the optional severity, thereby avoiding an unannounced software update;
  in response to the identified mandatory severity and the installation consent being automatic installation, proceeding with installation of the software package on the first device without the display; or
  in response to the identified optional severity or the installation consent being deferred install,
    pause for a first predetermined time period when the response from the second device with the display indicates selection of a defer option,
    send a deferral notification to the second device with the display after the first predetermined time period,
    automatically proceed with the installation of the software package on the first device without the display if the deferral notification is not responded to in a specified time period of the deferral notification, or deferring installation if the deferral notification is responded to in the specified period of the deferral notification and indicates a second predetermined time period,
    send a subsequent deferral notification to the second device with the display after the second predetermined time period,
    receive a second response from the second device with the display, and
    proceed with installation of the software package on the first device without the display when the second response is determined to indicate acceptance of the software package.

15. The non-transitory computer-readable medium of claim 14, further comprising:
  instruct the second device with the display to generate at least one of the deferral notification and subsequent deferral notifications to include accept and defer options but not a reject option when the software package request notification identifies that the software package is of the mandatory severity.

16. The non-transitory computer-readable medium of claim 14, wherein the deferral notification further includes a reject option when the software package request notification identifies that the software package is of the optional severity.

17. The non-transitory computer-readable medium of claim 14, further comprising:
proceed with the installation of the software package on the first device without the display when the response from the second device with the display is determined to indicate selection of an accept option.

18. The non-transitory computer-readable method of claim 14, wherein the second device is a computing device that stores an extended interface application that generates at least one of the deferral notification and subsequent deferral notifications; and
wherein the first device is a connected device without the display.

* * * * *